United States Patent [19]

Strahl et al.

[11] Patent Number: 5,781,316
[45] Date of Patent: Jul. 14, 1998

[54] SEMI-TRANSPARENT REFLECTIVE HOLOGRAM AND METHOD OF PRODUCING SAME

[75] Inventors: Guenter H. Strahl. Brick; David H. Bates. Freehold, both of N.J.

[73] Assignee: Transfer Print Foils, Inc., East Brunswick, N.J.

[21] Appl. No.: 771,377

[22] Filed: Dec. 16, 1996

Related U.S. Application Data

[63] Continuation of Ser. No. 395,793, Feb. 28, 1995, abandoned.

[51] Int. Cl.$^6$ .................................................. G03H 1/02
[52] U.S. Cl. .......................... 359/3; 359/2; 359/35; 283/86; 427/162
[58] Field of Search .................. 359/2, 3, 12, 35; 283/86; 235/457; 427/509, 521, 585, 587, 591, 162

[56] References Cited

U.S. PATENT DOCUMENTS

| | | | |
|---|---|---|---|
| 4,856,857 | 8/1989 | Takeuchi et al. | 359/3 |
| 5,145,212 | 9/1992 | Mallik | 283/86 |
| 5,184,848 | 2/1993 | Itoh et al. | 283/2 |
| 5,351,142 | 9/1994 | Cueli | 359/2 |
| 5,513,019 | 4/1996 | Cueli | 359/2 |

*Primary Examiner*—Thong Nguyen
*Assistant Examiner*—Darren E. Schuberg
*Attorney, Agent, or Firm*—Plevy & Associates

[57] ABSTRACT

A semi-transparent holographic transfer foil film for application to a substrate such as a security device. The film is comprised of a thermally stable carrier for supporting multiple layers of thermoplastic or thermoset coatings, wherein a heat sensitive release layer is applied to the carrier to enable separation of the carrier from the multiple layers of coatings under appropriate circumstances. A wear-resistant transparent top coat is applied over the release layer to act as an outer surface for the holographic film, the top coat may be treated or cured so as to increase its tenacity. An embossable coating is applied over the top coat, and is adapted to retain the impression of a holographically embossed image. A semi-transparent reflective layer of zinc sulfide is applied over the embossable coating for reflecting the holographically embossed image while at the same time enabling indicia found on a substrate or document to which the film will be applied to be viewed. A surface relief pattern is impressed within the reflective layer and the embossable coating to form the holographically embossed image or diffraction pattern. An adhesive coating and tie coat are applied over the other coatings for adhering the semi-transparent holographic film to the substrate.

11 Claims, 3 Drawing Sheets

SEMI-TRANSPARENT REFLECTIVE HOLOGRAM AND METHOD OF PRODUCING SAME

This is a continuation of application Ser. No. 08/395,793, filed on Feb. 28, 1995, now abandoned, entitled SEMI-TRANSPARENT REFLECTIVE HOLOGRAM AND METHOD OF PRODUCING SAME.

FIELD OF THE INVENTION

The present invention relates generally to the optical arts of holography and diffraction gratings, and more particularly to special forms of these optical devices for use in authenticating documents.

BACKGROUND OF THE INVENTION

Holography has been widely used in a variety of decorative and security applications to reproduce the appearance of three-dimensional images on many different substrates. One of the most well known applications for holography is in the field of document protection, wherein security documents, such as passports, credit cards, security passes, licenses, etc., are affixed with holograms in order to prevent forgery and discourage counterfeiting of such documents.

Holograms produced by means of a "transfer foil" are by far the most economical holograms that can be manufactured. These are embossed holograms, which are mass-produced by taking a shim, or metal "negative" of the holographic image, and making impressions of the image onto a desired substrate. Foil is the most popular choice of initial substrate, due to its relatively low cost and ease of transferability to another substrate. Transfer foil type holograms are for the most part multi-layered products. Although other layers may be present, depending on the manufacturer, most all of these products contain a carrier, release layer, protective coat, embossing coat, reflective metal layer and an adhesive backing. The adhesive backing is generally activated by heat and pressure to attach the holographic image and coatings to the appropriate substrate.

The above-type transfer foil holograms are generally opaque (colored gold or silver) and applied to a specific portion of a security document, as for example, to a corner section of a consumer credit card. These opaque holograms which are restricted in location have the disadvantage of protecting only a small portion of the security document. Accordingly, sophisticated would-be forgers have been able to defeat this type of security scheme by dissecting a protected document into parts and carefully reassembling these and other parts containing falsified indicia into an illegitimate document, so as not to disturb the hologram portion of the card or document.

Moreover, an opaque hologram does not allow for the viewing of any indicia on the substrate found underneath the hologram. Thus, in the case of compact security documents, such as licenses or identification cards, the loss of this viewable region places unwanted constraints on the amount and manner which information can be presented. In addition, the location where the hologram is to be formed is limited and the degree of freedom in designing the security document is severely restricted.

As a result of the aforementioned disadvantages, it has been thought of as being desirable to distribute holographic indicia over a substantial portion of a security document such that the hologram is structurally and visually associated with the entire document, rather than being relegated to a particular discrete area of the card. At the same time this hologram must be at least partially transparent so as to enable viewing of the indicia contained as part of the security document.

Attempts have been made in the prior art to create such a semi-transparent hologram which is distributed over a substantial portion of the document to be protected. U.S. Pat. No. 5,044,707 to Mallik, entitled NON-CONTINUOUS HOLOGRAMS, METHODS OF MAKING THEM AND ARTICLES INCORPORATING THEM discloses a reflective discontinuous hologram formed from a plurality of aluminum dots into a pattern that permits both viewing of the protected information on the substrate and viewing of the authentication image produced from the hologram. Because the dots are discontinuous a viewer may view through the holographic image represented in the dots to see indicia appearing below the discontinuous holographic pattern.

U.S. Pat. No. 4,856,857 to Takeuchi et al. entitled TRANSPARENT REFLECTION-TYPE discloses a transparent-type hologram comprising a transparent hologram-forming layer and a holographic effect-enhancing layer made up of a thin transparent film. The holographic effect-enhancing layer has a refractive index having a predetermined difference from the refractive index of the hologram-forming layer. Also U.S. Pat. No. 5,351,142 to Cueli entitled SEMI-TRANSPARENT REFLECTIVE LAYER FOR A PHASE HOLOGRAM discloses a phase hologram embossed in a mylar web having a tin tungsten oxide reflective layer deposited thereon. An embossed microtexture produces a hologram that is semi-transparent, thereby allowing the visualization of indicia underlying the hologram.

The above-referenced prior art methods, however, suffer from significant drawbacks because of either the quality of the holographic image produced, the difficulty in implementing the process, or high costs associated therewith. For example, the technique of using spaced aluminum dots to form a semi-transparent reflective layer is disadvantageous because the dots tend to obscure the underlying indicia. Similarly, a concept of tightly controlling and varying the thickness of the reflective layer while producing a semi-transparent hologram is difficult to achieve using traditional techniques for depositing metal coatings upon an embossed film. Other techniques are not highly attractive or have not been widely adopted because of the high cost of materials or high cost of implementation.

It is therefore an object of the present invention to provide an improved hologram or other diffraction pattern for application to a security document over visual indicia that is to be protected such that the protected information can be viewed through the hologram and an image reconstructed from the hologram may be observed. It is further an object of the present invention to provide a cost effective manner for implementation of the process.

SUMMARY OF THE INVENTION

The present invention is a semi-transparent holographic transfer foil film for application to a substrate such as a security device. The film is comprised of a thermally stable carrier for supporting multiple layers of thermoplastic or thermoset coatings, wherein a heat sensitive release layer is applied to the carrier to enable separation of the carrier from the multiple layers of coatings under appropriate circumstances. A wear-resistant transparent top coat is applied over the release layer to act as an outer surface for the holographic film, the top coat may be treated or cured so as to increase its tenacity. An embossable coating is applied over the top coat, and is adapted to retain the impression of a holographically embossed image. A semi-transparent reflective layer of zinc sulfide is applied over the embossable coating for reflecting the holographically embossed image while at the same time enabling indicia found on a substrate or document to which the film will be applied to be viewed. A surface relief pattern is impressed within the reflective layer and the embossable coating to form the holographically embossed image or diffraction pattern. An adhesive coating and tie coat are applied over the other coatings for adhering the semi-transparent holographic film to the substrate.

BRIEF DESCRIPTION OF THE FIGURES

For a better understanding of the present invention, reference may be had to the following description of an exemplary embodiment thereof, considered in conjunction with the accompanying drawings, in which.

DETAILED DESCRIPTION OF THE DRAWINGS

Figure 1:
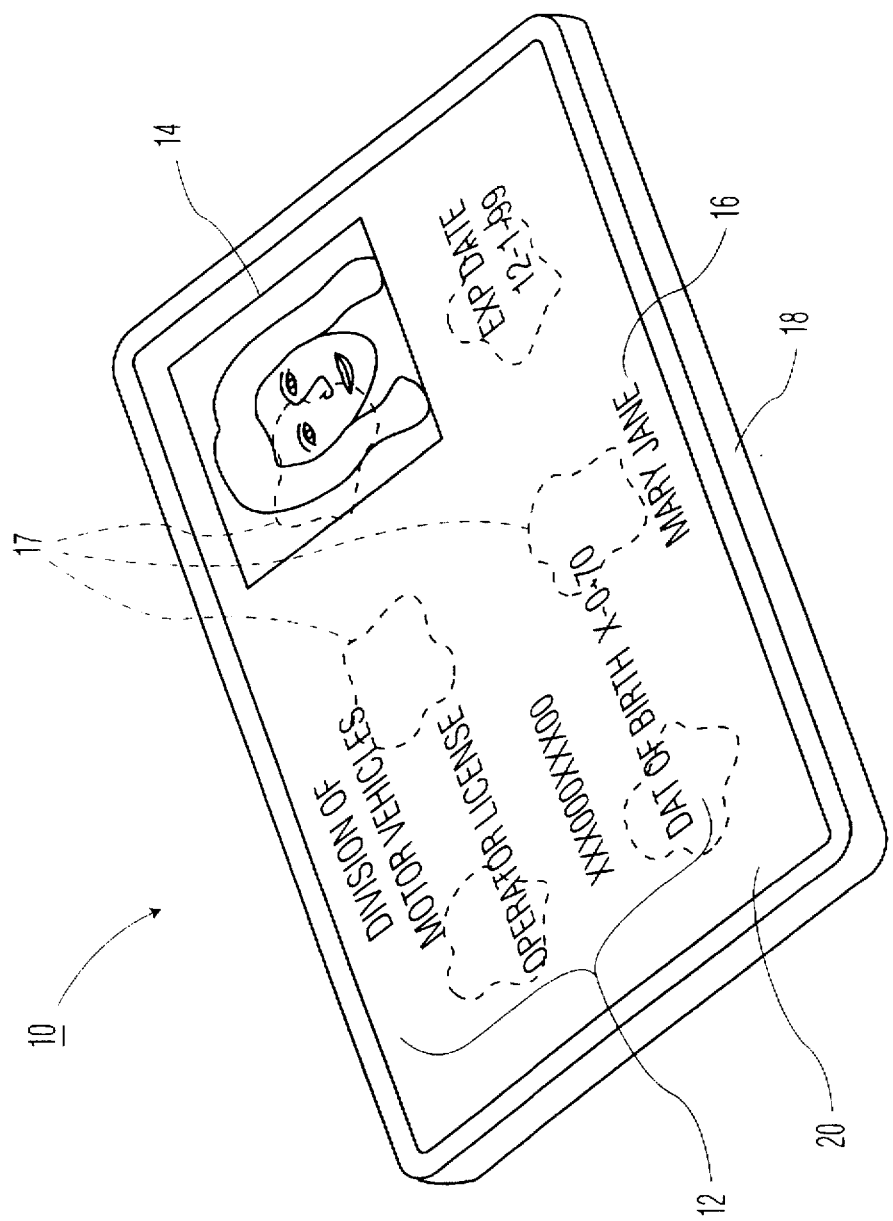
FIG. 1 is a perspective view of a security card employing the present invention semi-transparent distributed hologram.

Referring to FIG. 1 there is shown a security document 10, for example a driver's license, which utilizes the present invention semi-transparent hologram. The security document 10 includes various types of indicia to be protected, for example, printed identification data 12, photograph area 14 and signature area 16. The entire viewable area of the front side of the document 10 is covered by a semi-transparent distributed hologram 17 which is contained within one or more coating layers of the security document. A semi-transparent holographic layer enables viewing of the underlying indicia while at the same time being able to reconstruct the holographic image contained therein. The present invention semi-transparent hologram provides a unique visual effect while at the same time providing protection for the entire viewable area of the security document 10.

The present invention semi-transparent hologram is contained within or as part of a transfer film 20. The transfer film 20 can then easily be applied to a document substrate 18 containing indicia and other viewable information to be protected.

Figure 2:
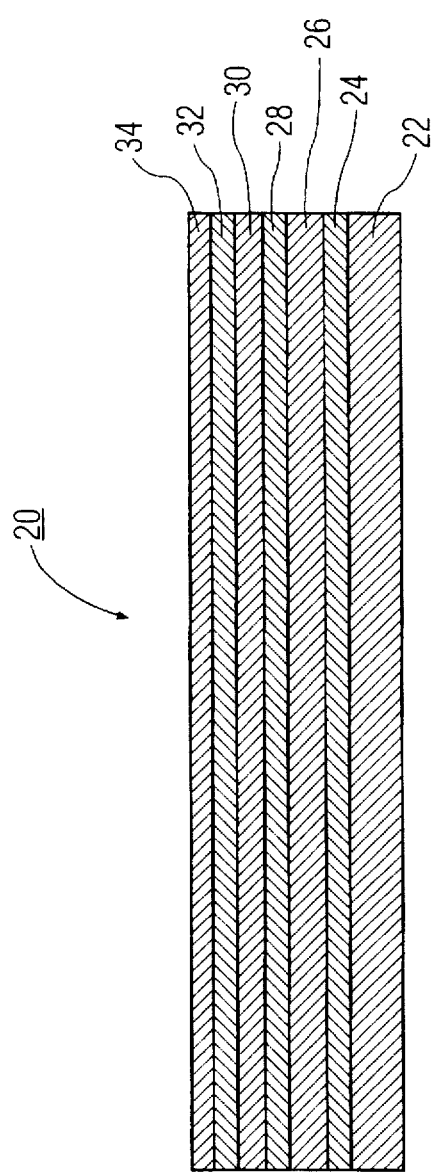
FIG. 2 shows a cross sectional view of the present invention holographic foil laminate.

Referring to FIG. 2, there is shown a cross section of one preferred embodiment of the present invention transfer film 20 which contains the semi-transparent hologram. As can be seen, the film is comprised of multiple layers of coatings which are applied during various stages of the manufacturing process. A first layer is a carrier 22 to which all the other layers of coatings are applied. The carrier 22 may be a polyester or other thermally stable film to which thermoplastic or other like coatings are advantageously applied. The carrier 22 will have a thickness in the range of between 0.5 and 10 mils. A release coat 24 is applied to the carrier 22 in order that the carrier may separate from the remainder of film 20 under appropriate circumstances. The release coat 24 is a natural wax or thermoplastic system which softens and eventually liquefies upon reaching a predetermined temperature. In this way, the carrier 22 can be easily removed from the film 20 upon thermal activation of the release coat 24. A thin layer of release coat on the order of 5 to 10 mils is normally suitable for the present application. It will be understood, however, that depending on the carrier and the substrate used in the specific application, that varying thicknesses of the release coat may be required.

A tenacious top coat 26 or film is applied over the release layer 24 to act as an outer layer of the film 20, once the carrier 22 is removed. The top coat 26 will be essentially transparent but may be tinted to clearly display indicia contained on the substrate and/or a holographic image contained within the film. The tenacious top coat 26 will be comprised of urethane, vinyl, acrylic, or any other abrasion resistant chemistry. Application of the top coat 26 will be performed via coating, casting, laminating or other known method, depending on the desired thickness of the outer layer. As is known in the art, the top coat 26 may be applied by means of gravure or Reverse roller, Mayer bar, coextrusion or lamination which are generally used to apply thicker films and coatings. In a preferred embodiment of the present invention, the thickness of the tenacious top coat 26 will be on the order of 0.5 to 3.0 lbs per ream.

The above coating 26 may be treated by means of an electron beam in order to change the characteristic tie of the coating. The coating 26 can also be air dried, heat set, UV cured or laminated in order to form a tenacious film. In addition to, or as an alternative to treating the top coat 26, a primer coat or tie coat 28 may be applied over the top coat 26 to thereby increase interfacial adhesion. The tie coat may consist of any chemical composition which aids in the interfacial adhesion. It will be understood, however, that depending on the specific application for the product, that treatment of the top coat or application of the tie coat may not be necessary.

An embossable coating 30 is next applied over the treated top coat 26 or tie coat 28, depending upon the application. The embossable coating 30 is a thermoplastic resin comprised of a urethane, nitro-cellulose mixture. The embossable coating is an impressionable coating which effectively has a memory to retain an embossed image. Thus, any impression formed within the embossable coating 30 will be retained therein. The embossable coating 30 may be treated in a similar fashion to the top coat 26 in order to alter the adhesion characteristics.

A semi-transparent reflective coating 32 is deposited onto the embossable coating 30. As mentioned previously, the semi-transparent reflective coating will allow a holographic image embossed therein to be viewed when oriented and illuminated at a proper angle. Any indicia contained on a security document substrate will also be viewable. The semi-transparent coating will preferably be comprised of zinc sulfide (ZnS) which is applied by means of a specially constructed deposition box.

Figure 3:
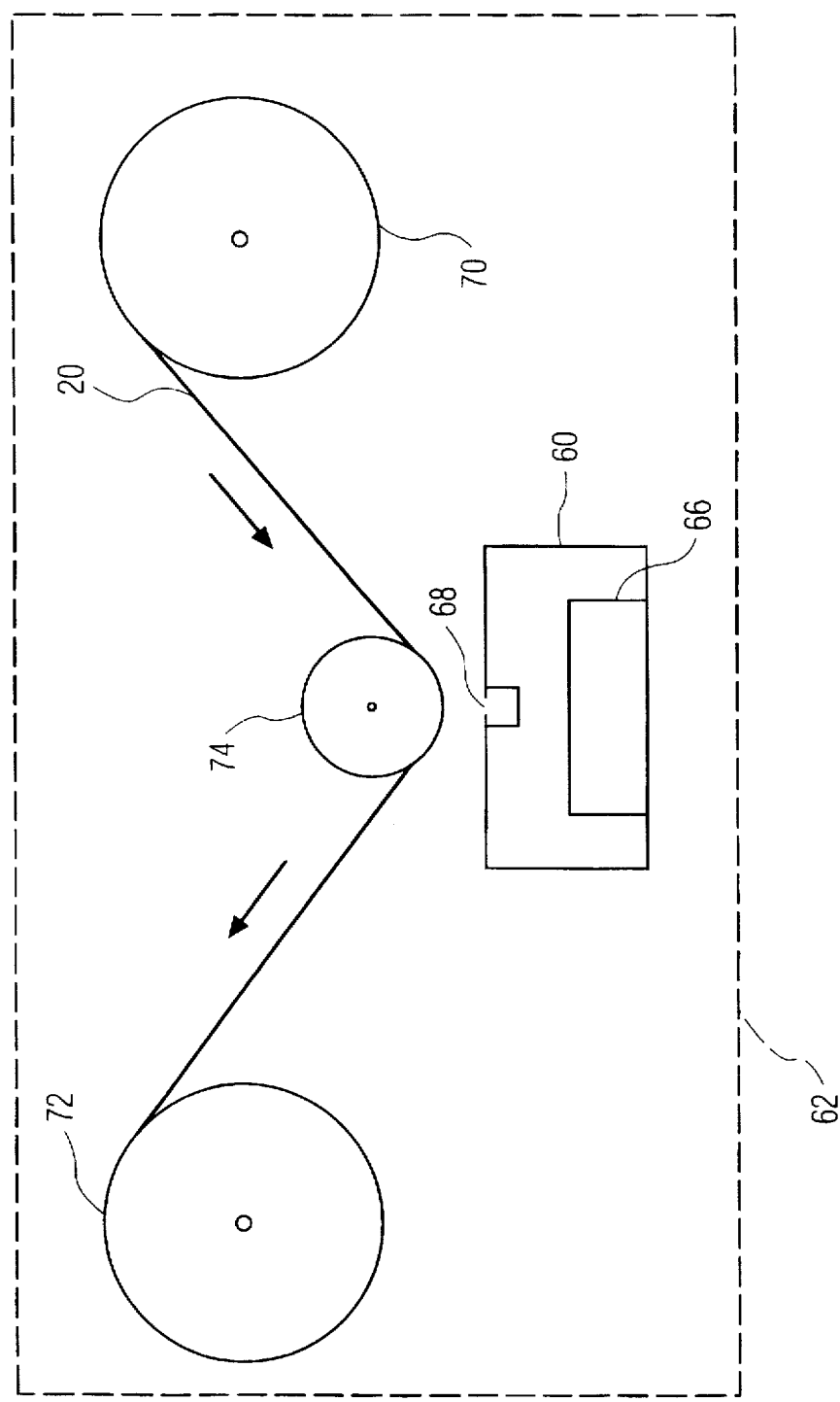
FIG. 3 shows one preferred embodiment for manufacture of the present invention semi-transparent distributed holographic foil laminate.

Referring to FIG. 3, there is shown one preferred embodiment for application of the zinc sulfide semi-transparent reflective coating 32 to the transfer film 20 according to the present invention. A thermally insulated heat box 60 is included within a vacuum chamber 62 with a vacuum of approximately $10^{-4}$ Torr. The heat box 60 includes a carbon crucible 66 in which is placed the material to be heated. In this case a very pure composition of zinc sulfide on the order of a 99.99% purity level is placed within the crucible. Zinc sulfide is a non-toxic and relatively inexpensive compound available in solid form usually as a coarse powder. The temperature in the heat box is raised gradually to a temperature of 1130° C. At this point the zinc sulfide appears to evaporate and will travel upwards through a narrow escape slot 68 in the heat box and condense on any material above the escape slot. In reality, zinc sulfide actually sublimes at temperatures above 1000° C., wherein the composition changes directly form a solid to a gas.

A transfer web 70 of transfer film 20 within the vacuum chamber 62 is passed directly over the escape slot 68 in the heat box and onto a take up roll 72. The transfer film interacts with an intermediate drum 74 which is chilled to a temperature below ambient. The sublimated zinc sulfide then condenses onto the transfer film 20 which is passing over the escape slot in the heat box. Presence of the chilled drum lowers the temperature of the film from the transfer web and greatly improves the adherence characteristics.

The transfer web is advanced over the heat box at rates between 120 ft./min and 315 ft./min., wherein rates of approximately 175 ft/ min have been found to be optimal. Coating thicknesses range between 600 and 1,200 angstroms, wherein preferred embodiments of the present invention transfer film are coated with thicknesses between 800 and 1000 angstroms. Thus, it can be seen that only a very thin coating of zinc sulfide is necessary to produce the desired semi-transparent holographic effect. It will be understood that the transfer film 20 which is coated with zinc sulfide will in all likelihood contain at least a carrier 22, top coat 26 and embossable coat 30 and that other coatings and or treatment may or may not be necessary depending on the final application for the product. The transfer film 20 may also be deposited with zinc sulfide by means of sputter deposition, wherein the target film is bombarded with charged atoms in a known manner.

The thickness of the coating of zinc sulfate can be regulated by varying the speed of advancement of the transfer web or the temperature of the heat box.

A hologram or diffraction grating will be embossed onto the transfer film 20 by a known manner. This can be done either before or after the transfer film 20 is coated with the zinc sulfide semi-transparent layer. The embossing is normally accomplished by means of a shim, which is in effect a metal negative of the holographic image, and impressing the shim into the embossable coat (and semi-transparent coating) to form the image. As is known in the art, the shim may be attached to a cylindrical roller, wherein the holographic images are sequentially formed by means of heat and pressure as the film 20 passes through the roller to be embossed. The hologram may be applied in register as in conjunction with an eye mark or randomly applied across the film.

The film 20 will then have applied to it an adhesive coating 34, such as a vinyl adhesive which is adhesively activated upon reaching a predetermined temperature. The completed transfer film will then be transferred onto a substrate containing indicia to be protected. The adhesive 34 will fuse to the document upon activation of the adhesive in order to create a protected security document.

The resulting document or other transfer structure enables indicia present on the substrate or other layer to be viewed while at the same time producing a holographic image which can be observed when the document is oriented accordingly. A tamper proof document including a distributed hologram is thus produced, wherein the document is especially resistant to attempted forgeries. This is because the entire surface of the document is essentially covered by a portion of the holographic image and any attempt at forgery would clearly reveal damage to the holographic image.

As used herein the term holographic image will include any diffraction grating or hologram, wherein the unitary term holographic image is utilized for simplification sake. The holographic image can be a repeating pattern with a predetermined amount of space between images or a unitary image having discernable parts and covering a substantial portion of the document. In this manner a forger is prevented from disassembling portions of the card and reassembling portions to thereby create a falsified document. The present invention semi-transparent holographic transfer film is suitable for mass transfer as a covering for licenses, credit cards, access cards and other like security documents. The hologram is transparent enough to view the underlying indicia while efficiently retaining the virtual image associated with the hologram.

From the above, it should be understood that the embodiment described, in regard to the drawings, is merely exemplary and that a person skilled in the art may make variations and modifications to the shown embodiment without departing from the spirit and scope of the invention. All such variations and modifications are intended to be included within the scope of the invention as defined in the appended claims.

What is claimed is:

1. A method of making a holographic security device having a semi-transparent holographic layer, comprising the steps of:

establishing an embossable coating on a carrier layer to thereby form a transfer film, said embossable coating adapted to retain the impression of a holographically embossed image;

providing an enclosure with an escape slot, said enclosure containing a zinc sulfide solid;

converting said zinc sulfide solid into a zinc sulfide gas which travels out of said enclosure through said slot;

passing said transfer film over said slot wherein said zinc sulfide gas passing through said slot condenses onto said transfer film as it passes over said slot, said condensed zinc sulfide gas forming a reflective layer of zinc sulfide over said embossable coating for reflecting said holographically embossed image;

forming a surface relief pattern over said reflective layer and said embossable coating to generate said holographically embossed image, wherein said reflective layer of zinc sulfide is partially transparent to thereby also allow viewing through said holographic image.

2. The method of claim 1, wherein said reflective coating of zinc sulfide is deposited onto said embossable layer at a thickness ranging from 800 to 1000 angstroms.

3. The method of claim 1, wherein said zinc sulfide is deposited onto said embossable coating utilizing sublimated zinc sulfide.

4. The method of claim 1, wherein said zinc sulfide is sputter deposited upon said embossable coating.

5. The method of claim 1, wherein said zinc sulfide layer is deposited on said embossable coating by advancing the transfer film over said slot at a feed rate ranging from 120 ft./min. to 315 ft./min.

6. The method of claim 5, wherein said feed rate is approximately 175 feet/minute.

7. The method of claim 1 wherein said zinc sulfide is heated to a temperature of 1130° C.

8. The method of claim 1 further including the steps of:

applying a release layer to said carrier to enable separation of said carrier from said multiple layers of thermoplastic coatings;

positioning a wear-resistant transparent top coat over said release layer to act as an outer surface of said holographic film.

9. The method of claim 8 further including the step of applying an adhesive layer over said reflective layer of zinc sulfide.

10. The method of claim 9, further including the step of applying said film to a substrate by means of heat and pressure, whereby said carrier is released from said film.

11. The method of claim 1, wherein said reflective layer is applied as said carrier layer is passed over a chilled drum.

\* \* \* \* \*